United States Patent
Han et al.

(10) Patent No.: US 11,665,397 B2
(45) Date of Patent: May 30, 2023

(54) IMAGE DISPLAY APPARATUS AND METHOD THEREOF

(71) Applicant: LG ELECTRONICS INC., Seoul (KR)

(72) Inventors: Donghee Han, Seoul (KR); Sijin Kim, Seoul (KR); Taeyoung Kim, Seoul (KR); Soonhyung Hwang, Seoul (KR); Hyorim Kim, Seoul (KR); Minjae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 17/322,731

(22) Filed: May 17, 2021

(65) Prior Publication Data

US 2021/0360315 A1    Nov. 18, 2021

(30) Foreign Application Priority Data

May 18, 2020 (KR) ........................ 10-2020-0059155

(51) Int. Cl.
*H04N 21/442* (2011.01)
*H04W 4/80* (2018.01)
(Continued)

(52) U.S. Cl.
CPC .. *H04N 21/44209* (2013.01); *H04N 21/41265* (2020.08); *H04N 21/42222* (2013.01); *H04N 21/4852* (2013.01); *H04W 4/80* (2018.02)

(58) Field of Classification Search
CPC ......... H04N 21/2402; H04N 21/26216; H04N 5/04; H04N 5/60; H04N 7/15
See application file for complete search history.

(56) References Cited

U.S. PATENT DOCUMENTS

| 2007/0116297 A1* | 5/2007 | Mishra ................. H04H 40/27 381/307 |
| 2013/0324031 A1 | 12/2013 | Loureiro |

(Continued)

FOREIGN PATENT DOCUMENTS

| CN | 101032187 | 9/2007 |
| CN | 101361274 | 2/2009 |

(Continued)

OTHER PUBLICATIONS

European Patent Office Application Serial No. 21174005.5, Search Report dated Sep. 28, 2021, 11 pages.

(Continued)

*Primary Examiner* — Samira Monshi
(74) *Attorney, Agent, or Firm* — Lee Hong Degerman Kang Waimey

(57) ABSTRACT

The present disclosure relates to an image display apparatus and a method thereof. The image display apparatus according to an embodiment of the present disclosure comprises: a display; an external device interface configured to perform short-range communication; and a controller configured to: when the number of external devices communicatively connected with the image display apparatus is one, or when a bandwidth usage for the short-range communication is less than a predetermined reference, transmit an entire signal to the one external device, when the number of the external devices is two or more, and the bandwidth usage is greater than or equal to the predetermined reference, acquire a plurality of channel signals from the entire signal; transmit a first channel signal to a first external device among the external devices; and transmit a second channel signal to a second external device among the external devices.

15 Claims, 12 Drawing Sheets

(51) Int. Cl.
    *H04N 21/41*     (2011.01)
    *H04N 21/422*     (2011.01)
    *H04N 21/485*     (2011.01)

(56) References Cited

U.S. PATENT DOCUMENTS

2018/0048846 A1    2/2018   Ko et al.
2019/0387344 A1   12/2019   Kim et al.

FOREIGN PATENT DOCUMENTS

| | | |
|---|---|---|
| CN | 102355614 | 2/2012 |
| CN | 102985968 | 3/2013 |
| CN | 103188503 | 7/2013 |
| CN | 103621110 | 3/2014 |
| CN | 106454635 | 2/2017 |
| CN | 108370486 | 8/2018 |
| CN | 109412624 | 3/2019 |
| CN | 109478400 | 3/2019 |
| EP | 3373524 | 9/2018 |
| KR | 10-2013-0077746 | 7/2013 |
| WO | 2019-165642 | 9/2019 |

OTHER PUBLICATIONS

State Intellectual Property Office of the People's Republic of China Application Serial No. 202110539303.0, Office Action dated Oct. 28, 2022, 10 pages.

* cited by examiner

IMAGE DISPLAY APPARATUS AND METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2020-0059155, filed on May 18, 2020, the contents of which are hereby incorporated by reference herein in its entirety.

BACKGROUND OF THE INVENTION

Field of the Disclosure

The present disclosure relates to an image display apparatus and method thereof.

Description of the Related Art

An image display apparatus is an apparatus having a function of displaying an image that can be watched by a user, and the user can watch a broadcast through the image display apparatus. For example, the image display apparatus may include a Television TV having a liquid crystal display LCD using liquid crystal or an OLED display using an organic light emitting diode OLED.

Such the image display apparatus may transmit/receive data to and from various electronic devices by wire and/or wirelessly. For example, the image display apparatus may perform communication connection with an external audio device through Bluetooth, which is one of short-range communication methods.

In general, when a high-quality audio signal is transmitted to the external audio device, the amount of data transmitted per hour from the image display apparatus to the external audio device increases compared to when a low-quality audio signal is transmitted. Accordingly, the bandwidth usage between the image display apparatus and the external audio device increases.

Meanwhile, since a conventional image display apparatus is generally connected to one external audio device, even when transmitting the high-quality audio signal to the external audio device, it is possible to sufficiently transmit the high-quality audio signal within an allowable bandwidth usage.

In recent years, with the development of technology in the field of short-range communication, the image display apparatus may be connected to two or more external audio devices for communication at the same time. However, when transmitting the same high-quality audio signals to both or more external audio devices, a bandwidth usage for short-range communication may significantly increase compared to the case of being connected to one external audio device, so that the allowable value of the bandwidth usage is exceeded, and thus communication performance may be deteriorated.

In addition, as not only the external audio device but also other external devices such as smart phones, laptops, wearable devices, and the like are additionally connected to the image display apparatus through short-range communication, there may be a problem that the bandwidth usage exceeds the allowable value.

SUMMARY

It is an object of the present disclosure to solve the above and other problems.

It is another object of the present disclosure to provide an image display apparatus and method thereof that may transmit audio signals to two or more audio devices simultaneously without exceeding the allowable value of the bandwidth usage.

In accordance with an aspect of the present disclosure, an image display apparatus may comprise: a display; an external device interface including at least one communication module configured to perform short-range communication; and a controller configured to: when the number of external audio devices communicatively connected with the image display apparatus is one, or when a bandwidth usage for the short-range communication is less than a predetermined reference, transmit an entire audio signal to the one external audio device, when the number of the external audio devices is two or more, and the bandwidth usage is greater than or equal to the predetermined reference, acquire a plurality of channel signals from the entire audio signal; transmit a first channel signal from among the plurality of channel signals to a first external audio device among the external audio devices; and transmit a second channel signal from among the plurality of channel signals to a second external audio device among the external audio devices.

In accordance with an aspect of the present disclosure, a method of an image display apparatus is provided. The method comprises: when the number of external audio devices communicatively connected with the image display apparatus is one, or when a bandwidth usage for short-range communication is less than a predetermined reference, transmitting an entire audio signal to the one external audio device through an external device interface including at least one communication module configured to perform the short-range communication, when the number of the external audio devices is two or more, and the bandwidth usage is greater than or equal to the predetermined reference, acquiring a plurality of channel signals from the entire audio signal; transmitting, through the external device interface, a first channel signal from among the plurality of channel signals to a first external audio device among the external audio devices; and transmitting, through the external device interface, a second channel signal from among the plurality of channel signals to a second external audio device among the external audio devices.

According to the present disclosure, the image display apparatus and method thereof have the following effects.

According to various embodiments of the present disclosure, when two or more external audio devices are connected to the image display apparatus and the bandwidth usage for short-range communication exceeds the allowable value, it is possible to stably transmit audio signals to both of two or more external audio devices and to provide a high-quality surround sound to a user, by separating an entire audio signal into a plurality of channel signals, processing the plurality of channel signals, and transmitting them to two or more external audio devices.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

DESCRIPTION OF EXEMPLARY EMBODIMENTS

Figure 1A:
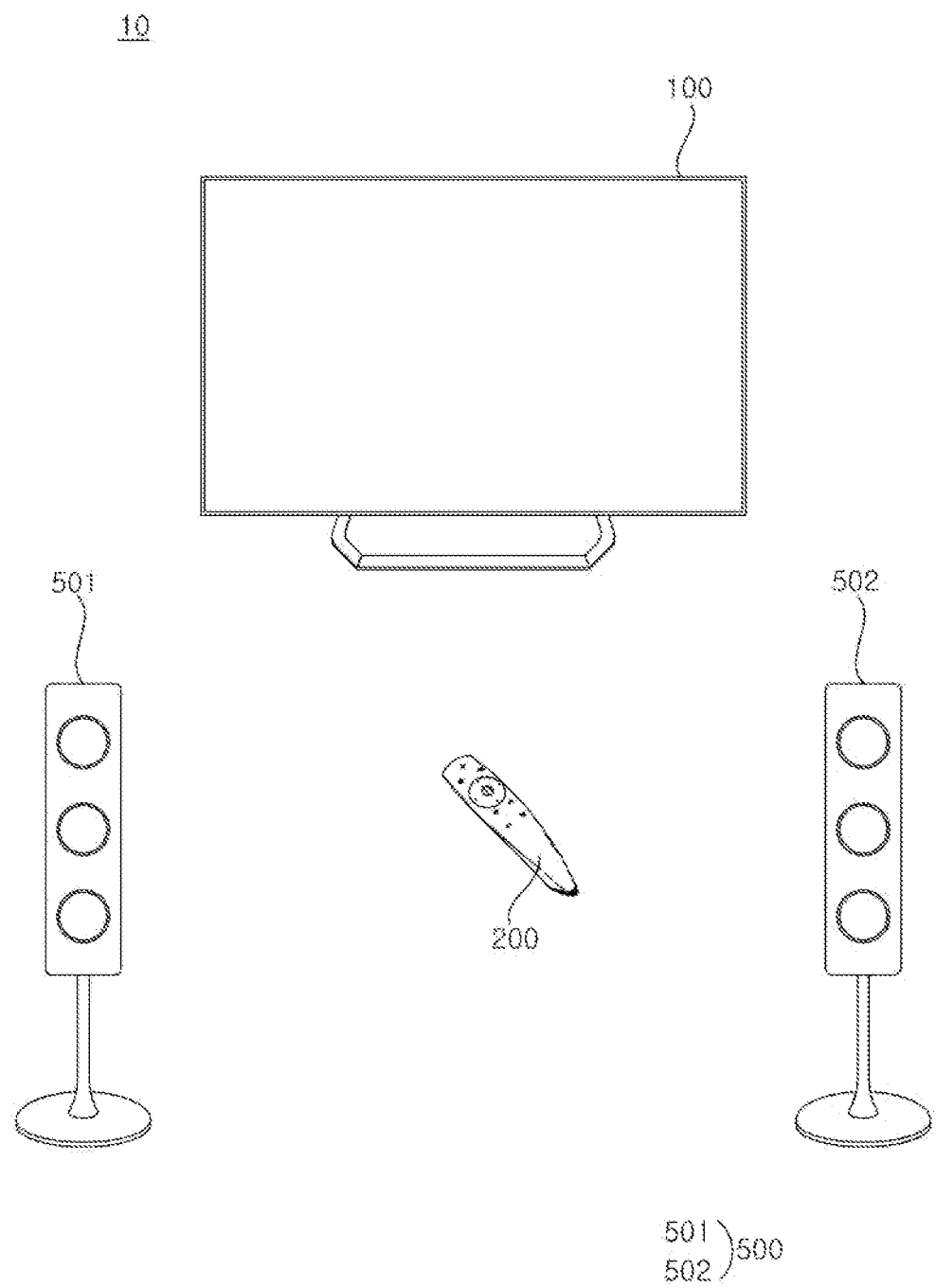
FIGS. 1A and 1B are diagrams illustrating an image display system according to an embodiment of the present disclosure.

Hereinafter, the present disclosure will be described in detail with reference to the accompanying drawings. In order to clearly and briefly describe the present disclosure, components that are irrelevant to the description will be omitted in the drawings. The same reference numerals are used throughout the drawings to designate the same or similar components.

Terms "module" and "part" for elements used in the following description are given simply in view of the ease of the description, and do not carry any important meaning or role. Therefore, the "module" and the "part" may be used interchangeably.

It should be understood that the terms "comprise", "include", "have", etc. when used in this specification, specify the presence of stated features, integers, steps, operations, elements, components, or combinations of them but do not preclude the presence or addition of one or more other features, integers, steps, operations, elements, components, or combinations thereof.

It will be understood that, although the terms "first", "second", etc. may be used herein to describe various elements, these elements should not be limited by these terms. These terms are only used to distinguish one element from another element.

Figure 1B:
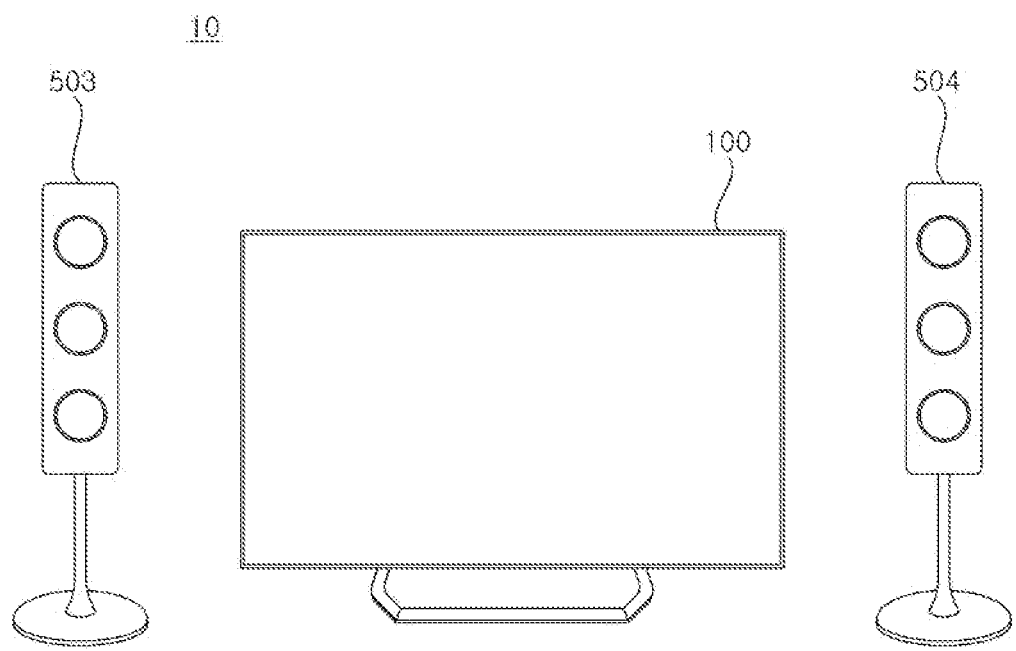

FIGS. 1A and 1B are diagrams illustrating an image display system according to an embodiment of the present disclosure.

Referring to FIGS. 1A and 1*i*, an image display system 10 may include an image display apparatus 100, a remote control device 200 and/or an external audio device 500.

The image display apparatus 100 may be an apparatus that processes and outputs an image. The image display apparatus 100 is not particularly limited such as a TV, a notebook computer, a monitor, and the like as long as it can output a screen corresponding to an image signal.

The image display apparatus 100 may receive a broadcast signal, signal-process the broadcast signal, and output a signal-processed broadcast image. When the image display apparatus 100 receives a broadcast signal, the image display apparatus 100 may correspond to a broadcast reception device.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. In this case, the remote control device 200 may include a device that establishes a wired or wireless network with the image display apparatus 100 and transmits various control signals to the image display apparatus 100 through the established network, or receives a signal related to various operations processed by the image display apparatus 100 from the image display apparatus 100.

For example, various input devices, such as a mouse, a keyboard, a space remote controller, a trackball, a joystick, and the like may be used as the remote control device 200. The remote control device 200 may be referred to as an external device, and hereinafter, it should be noted that an external device and a remote control device can be mixed and used, if necessary.

The image display apparatus 100 may be connected to only a single remote control device 200, or connected to two or more remote control devices 200 at the same time, and may change the object displayed on a screen or adjust the state of the screen, based on a control signal provided from each remote control device 200.

The image display apparatus 100 and the external audio device 500 may mutually wirelessly transmit and receive signals including data. For example, the image display apparatus 100 and the external audio device 501 and 502 may mutually perform pairing to establish a communication channel, and transmit and receive data through the communication channel.

The external audio device 500 may output audio. For example, the external audio device 500 may output audio based on an audio signal received from the image display apparatus 100. In this case, each of the external audio devices 501 and 502 may receive the same audio signal from the image display apparatus 100 or may receive different audio signals from the image display apparatus 100.

Although two external audio devices 501 and 502 are illustrated in FIG. 1A, the present disclosure is not limited thereto, and the image display system 10 may include three or more external audio devices 501 to 504 as shown in FIG. 1B.

Figure 2:
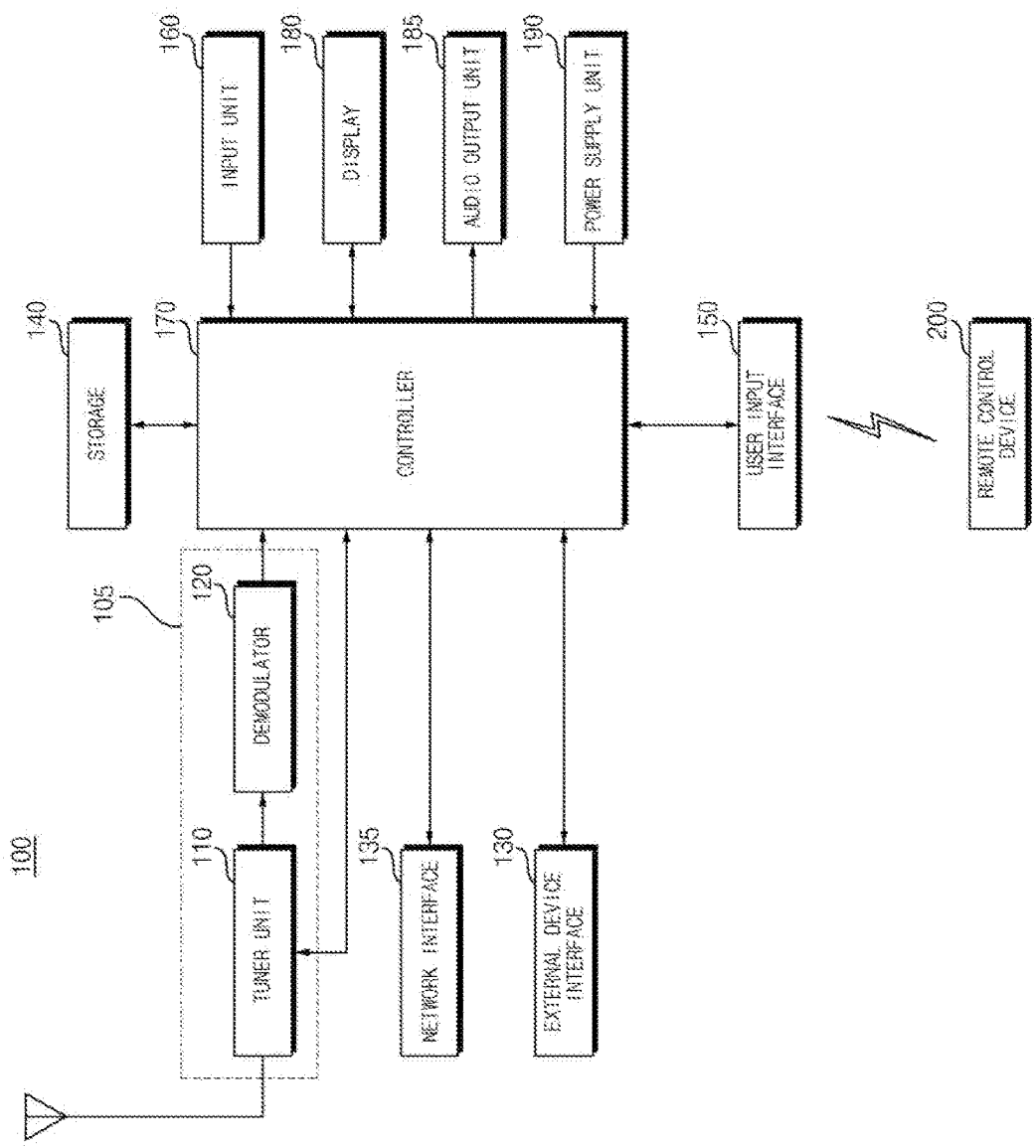
FIG. 2 is an internal block diagram of the image display apparatus of FIGS. 1A and 1B.

FIG. 2 is an internal block diagram of the image display apparatus of FIGS. 1A and 1B.

Referring to FIG. 2, the image display apparatus 100 may include a broadcast reception unit 105, an external device interface 130, a network interface 135, a storage unit 140, a user input interface 150, an input unit 160, a controller 170, a display 180, an audio output unit 185 and/or a power supply unit 190.

The broadcast reception unit 105 may include a tuner 110 and a demodulation unit 120.

Meanwhile, unlike the drawing, it is also possible that the image display apparatus 100 includes only the broadcast reception unit 105, and the external device interface 130, among the broadcast reception unit 105, the external device interface 130, and the network interface 135. That is, the image display apparatus 100 may not include the network interface 135.

The tuner 110 may select a broadcast signal corresponding to a channel selected by a user or all previously stored channels from among broadcast signals received through an antenna or a cable. The tuner 110 may convert the selected broadcast signal into an intermediate frequency signal, a baseband image, or an audio signal.

For example, if the selected broadcast signal is a digital broadcast signal, the tuner 110 may convert the digital broadcast signal into a digital IF signal (DIF). If the selected broadcast signal is an analog broadcast signal, the tuner 110 may convert the analog broadcast signal into an analog baseband image or audio signal (CVBS/SIF). That is, the tuner 110 may process a digital broadcast signal or an analog broadcast signal. The analog baseband image or audio signal (CVBS/SIF) output from the tuner 110 may be directly input to the controller 170.

Meanwhile, the tuner 110 may sequentially select broadcast signals of all broadcast channels stored through a channel memory function among received broadcast signals, and convert the broadcast signals into an intermediate frequency signal, a baseband image, or an audio signal.

Meanwhile, the tuner 110 may include a plurality of tuners in order to receive broadcast signals of a plurality of channels. Alternatively, a single tuner that simultaneously receives broadcast signals of multiple channels may be provided.

A demodulation unit 120 may perform a demodulation operation by receiving the digital IF signal DIF converted by the tuner 110.

The demodulation unit 120 may output a stream signal TS after performing demodulation and channel decoding. In this situation, the stream signal may be a signal which is obtained by multiplexing an image signal, an audio signal, or a data signal.

The stream signal output from the demodulation unit 120 may be input to the controller 170. After performing demultiplexing, image/audio signal processing, and the like, the controller 170 may output an image through the display 180 and output an audio through the audio output unit 185.

The external device interface 130 may transmit or receive data with a connected external device. To this end, the external device interface 130 may include an A/V input/output unit.

The external device interface 130 may be connected to an external device such as a digital versatile disk (DVD), a Blu ray, a game device, a camera, a camcorder, a computer (laptop), a set-top box, and the like by wire/wireless, and may perform input/output operations with the external device.

Figure 1B:
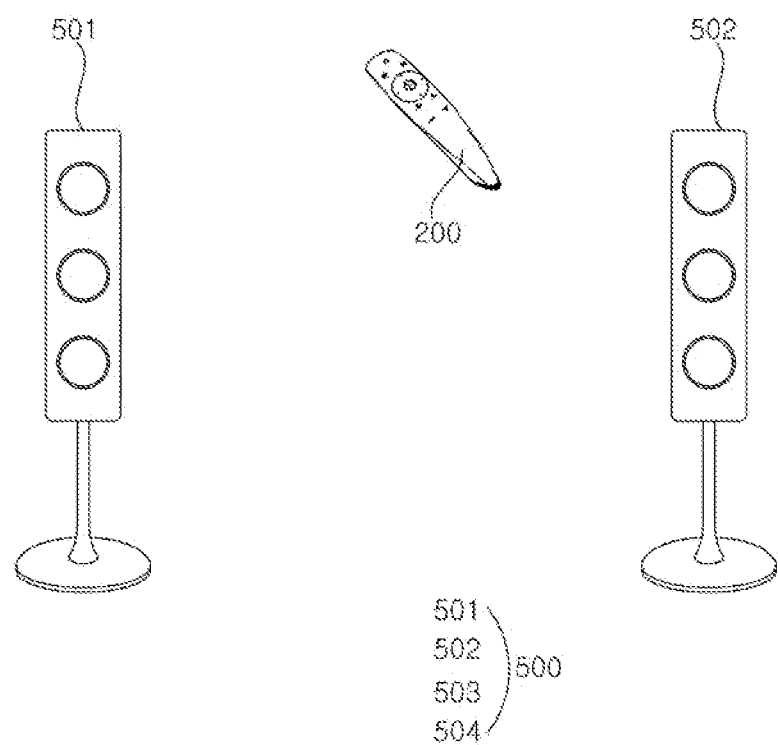

In addition, the external device interface 130 communicates with various remote control device 200 as shown in FIG. 1, and may receive a control signal related to the operation of the image display apparatus 100 from the remote control device 200, or may transmit data related to the operation of the image display apparatus 100 to the remote control device 200.

In addition, the external device interface 130 may establish a communication channel with the external audio device 500 to transmit and receive data to and from each other.

An A/V input/output unit may receive image and audio signals from an external device. For example, the A/V input/output unit may include an Ethernet terminal, a USB terminal, CVBS (Composite Video Banking Sync) terminal, component terminal, S-video terminal (analog), DVI (Digital Visual Interface) terminal, HDMI (High Definition Multimedia Interface) terminal, MHL (Mobile High-definition Link) terminal, RGB terminal, D-SUB terminal, IEEE 1394 terminal, SPDIF terminal, Liquid HD terminal, and the like. Digital signals input through these terminals may be transmitted to the controller 170. In this situation, the analog signal input through the CVBS terminal and the S-video terminal may be converted into a digital signal through an analog-digital converter and transmitted to the controller 170.

The external device interface 130 may include a communication module for short-range wireless communication with other electronic devices. Through such the communication module, the external device interface 130 may exchange data with an adjacent mobile terminal.

The network interface 135 may provide an interface for connecting the image display apparatus 100 to a wired/wireless network including an Internet network. For example, by wired/wireless communication with a relay device such as an access point, the network interface 135 may connect to a local network through the access point or may access a server using the Internet.

Meanwhile, the network interface 135 may include a communication module for connection with a wired/wireless network.

The external device interface 130 and/or the network interface 135 may include a communication module for short-range communication such as Wi-Fi (Wireless Fidelity), Bluetooth, Bluetooth Low Energy (BLE), Zigbee, and NFC (Near Field Communication), a communication module for cellular communication such as such as long-term evolution (LTE), LTE-A (LTE Advance), code division multiple access (CDMA), wideband CDMA (WCDMA), universal mobile telecommunications system (UMTS), and wireless broadband (WiBro), and the like.

The network interface 135 may transmit or receive data with other users or other electronic devices through a connected network or another network linked to the connected network.

The network interface 135 may receive update information and an update file of firmware provided by the network operator, and may transmit data to the content provider or the network operator.

The network interface 135 may select and receive a desired application from among applications open to the public through the network.

The storage unit 140 may store a program for processing and controlling each signal in the controller 170 or may store a signal-processed image, audio, or data signal.

For example, the storage unit 140 may store application programs designed for performing various tasks that can be processed by the controller 170, and may provide some of the stored application programs selectively when requested by the controller 170.

For example, the storage unit 140 may store audio parameters related to processing of an audio signal. Here, the audio parameters may include a gain, an equalizer (EQ), a bass enhancer, a sound retrieval system (SRS), Sound Booster, Dynamic Booster, 3D (Dimension) Sound, Reverberation, Noise Canceller, AEC (Acoustic Echo Control), AGC (Auto Gain Control), NS(Noise Suppression), Sample Rate, Codec Type, Voice Enhancement, Filter, and the like.

Program, or the like stored in the storage unit 140 is not particularly limited as long as they can be executed by the controller 170.

The storage unit 140 may perform a function for temporary storage of an image, audio, or data signal received from an external device through the external device interface 130.

The storage unit 140 may store information on a certain broadcast channel, through a channel storage function such as a channel map.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of volatile memory (e.g. DRAM, SRAM, SDRAM, etc.), and nonvolatile memory (e.g. flash memory, hard disk drive HDD, and solid-state drive SSD, etc.). In various embodiments of the present disclosure, the storage unit 140 and a memory may be used interchangeably.

The user input interface 150 may transmit a signal input by the user to the controller 170, or may transmit a signal from the controller 170 to the user.

For example, the user input interface 150 may transmit/receive a user input signal such as power on/off, channel selection, and screen setting from the remote control device 200, transmit a user input signal input from a local key such as a power key, a channel key, a volume key, and a setting key to the controller 170, transmit a user input signal input from a sensor unit that senses a user's gesture to the controller 170, or transmit a signal from the controller 170 to a sensor unit.

The input unit 160 may be provided in one side of the main body of the image display apparatus 100. For example, the input unit 160 may include a touch pad, a physical button, or the like.

The input unit 160 may receive various user commands related to the operation of the image display apparatus 100, and may transmit a control signal corresponding to the input command to the controller 170.

The input unit 160 may include at least one microphone, and may receive a user's voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or another hardware-based processor.

The controller 170 may demultiplex the stream input through the tuner 110, the demodulation unit 120, the external device interface 130, or the network interface 135, or may generate and output a signal for image or audio output by processing demultiplexed signals.

The display 180 may generate a driving signal by converting the data signal, the OSD signal, the control signal, the image signal processed by the controller 170, or the data signal, the control signal, the image signal received from the external device interface 130, or the like.

The display 180 may include a display panel including a plurality of pixels.

A plurality of pixels provided in a display panel may include a RGB subpixel. Alternatively, a plurality of pixels included in a display panel may include a RGBW subpixel. The display 180 may generate a driving signal for a plurality of pixels, by converting the image signal, the data signal, the OSD signal, the control signal, and the like processed by the controller 170.

The display 180 may be a Plasma Display Panel (PDP), a Liquid Crystal Display (LCD), an Organic Light Emitting Diode (OLED), a flexible display, or the like and may also be a 3D display. The 3D display 180 may be classified into a glasses-free type and a glasses type.

Meanwhile, the display 180 may be configured as a touch screen and used as an input device in addition to an output device.

The audio output unit 185 may include at least one speaker and receive an audio-processed signal from the controller 170 and outputs as an audio.

The image signal image-processed by the controller 170 may be input to the display 180 and displayed as an image corresponding to a pertinent image signal. In addition, the image signal image-processed by the controller 170 may be input to an external output device through the external device interface 130.

The audio signal processed by the controller 170 may be output as an audio to the audio output unit 185. In addition, the audio signal processed by the controller 170 may be transmitted to an external output device through the external device interface 130.

Although not shown in FIG. 2, the controller 170 may include a demultiplexer, an image processing unit, and the like. This will be described later with reference to FIG. 3.

In addition, the controller 170 may control the overall operation of the image display apparatus 100. For example, the controller 170 may control the tuner 110 to select (tune) a channel selected by a user or a broadcast corresponding to a previously stored channel.

In addition, the controller 170 may control the image display apparatus 100 according to a user command input through the user input interface 150 or an internal program.

Meanwhile, the controller 170 may control the display 180 to display an image. In this situation, the image displayed on the display 180 may be a still image or a moving image, and may be a 2D image or a 3D image.

Meanwhile, the controller 170 may display a certain 2D object within an image displayed on the display 180. For example, the object may be at least one of an accessed web screen (newspaper, magazine, etc.), an electronic program guide (EPG), various menus, widget, icon, still image, moving image, and text.

Meanwhile, the image display apparatus 100 may further include a photographing unit. The photographing unit may photograph a user. The photographing unit may be implemented with one camera, but is not limited thereto, and may be implemented with a plurality of cameras. Meanwhile, the photographing unit may be embedded in the image display apparatus 100 on the display 180 or may be separately disposed. Image information photographed by the photographing unit may be input to the controller 170.

The controller 170 may recognize a user's location, based on the image photographed by the photographing unit. For example, the controller 170 may determine a distance (z-axis coordinate) between the user and the image display apparatus 100. In addition, the controller 170 may determine the x-axis coordinates and the y-axis coordinates in the display 180 corresponding to the user location.

The controller 170 may detect a user's gesture based on the image photographed by the photographing unit, or each of signals detected by the sensor unit or a combination thereof.

The power supply unit 190 may supply corresponding power throughout the image display apparatus 100. In particular, the power supply unit 190 may supply power to the controller 170 that can be implemented in the form of a System On Chip (SOC), the display 180 for displaying an image, the audio output unit 185 for outputting audio, and the like.

Specifically, the power supply unit 190 may include a converter for converting AC power into DC power, and a DC/Dc converter for converting the level of DC power.

The remote control device 200 may transmit a user input to the user input interface 150. To this end, the remote control device 200 may use Bluetooth, Radio Frequency (RF) communication, Infrared Radiation communication, Ultra-wideband (UWB), ZigBee, and the like. In addition, the remote control device 200 may receive an image, audio, or data signal output from the user input interface 150, and display it on the remote control device 200 or output as an audio.

Meanwhile, the above-described image display apparatus 100 may be a digital broadcast receiver capable of receiving a fixed or mobile digital broadcast.

Meanwhile, the block diagram of the image display apparatus 100 shown in FIG. 2 is just a block diagram for an embodiment of the present disclosure, and each component of the block diagram can be combined, added, or omitted in accordance with the specifications of the image display apparatus 100 that is actually implemented.

That is, if necessary, two or more components may be combined into a single component, or one component may be subdivided into two or more components. In addition, the functions performed in each block are for explaining the embodiment of the present disclosure, and a specific operation or device thereof does not limit the scope of the present disclosure.

Figure 3:
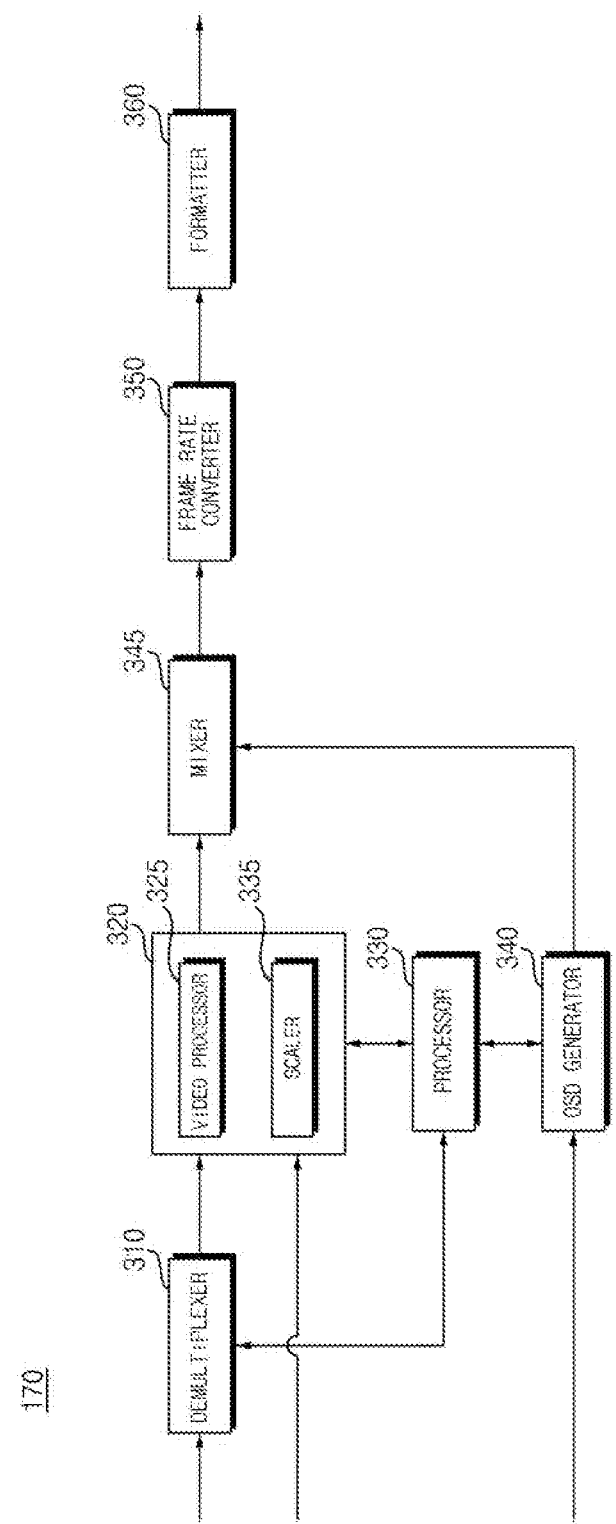
FIG. 3 is an internal block diagram of a controller of FIG. 2.

FIG. 3 is an internal block diagram of a controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, an audio processing unit and a data processing unit may be further included.

The demultiplexer 310 may demultiplex an input stream. For example, when an MPEG-2 TS is input, it can be demultiplexed and separated into image, audio, and data signal, respectively. Here, the stream signal input to the demultiplexer 310 may be a stream signal output from the tuner 110, the demodulation unit 120, or the external device interface 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling so that the resolution of the decoded image signal can be output from the display 180.

The image decoder 325 may include decoders of various standards. For example, the image decoder 325 may include an MPEG-2, H.264 decoder, a 3D image decoder for color image and depth image, a decoder for multiple view images, and the like.

The processor 330 may control overall operation within the image display apparatus 100 or within the controller 170. For example, the processor 330 may control the tuner 110 to select (tune) a broadcast corresponding to a channel selected by a user or a previously stored channel.

In addition, the processor 330 may control the image display apparatus 100 according to a user command input through the user input interface 150 or an internal program.

In addition, the processor 330 may control data transmission with the network interface 135 or the external device interface 130.

Further, the processor 330 may control operation of the demultiplexer 310, the image processing unit 320, and the OSD generator 340 in the controller 170.

The OSD generator 340 may generate an OSD signal by itself or according to a user input. For example, the OSD generator 340 may generate a signal for displaying various types of information on the screen of the display 180 as a graphic or text, based on a user input signal input through the input unit 160.

The generated OSD signal may include various data such as a user interface screen, various menu screens, widgets, icons, and the like of the image display apparatus 100. In addition, the generated OSD signal may include a 2D object or a 3D object.

In addition, the OSD generator 340 may generate a pointer that can be displayed on the display 180, based on a pointing signal input from the remote control device 200. The OSD generator 340 may include a pointing signal processing unit that generates a pointer. The pointing signal processing unit may not be provided in the OSD generator 340 and may be provided separately.

The mixer 345 may mix the OSD signal generated by the OSD generator 340 and the decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly without additional frame rate conversion.

The formatter 360 may arrange a left-eye image frame and a right-eye image frame of a frame rate-converted 3D image. In addition, the formatter 360 may output a synchronization signal Vsync for opening the left-eye glass and the right-eye glass of a 3D viewing device.

Meanwhile, the formatter 360 may convert the format of an input image signal into an image signal for display on the display 180 and output it.

In addition, the formatter 360 may change the format of the 3D image signal. For example, the formatter 360 may change the format of the 3D image signal into any one format among various 3D formats such as Side by Side format, Top/Down format, Frame Sequential format, Interlaced format, Checker Box format, and the like.

Meanwhile, the formatter 360 may convert a 2D image signal into a 3D image signal. For example, according to a 3D image generation algorithm, the formatter 360 may detect an edge or a selectable object in a 2D image signal, and separate and generate into a 3D image signal by the object according to the detected edge or the selectable object. In this case, the generated 3D image signal may be separated and arranged into a left-eye image signal L and a right-eye image signal R, as described above.

Meanwhile, although not shown in the drawing, after the formatter 360, a 3D processor for processing a 3-dimensional (3D) effect signal may be further disposed. Such a 3D processor may process brightness, tint, and color adjustment of an image signal in order to improve a 3D effect. For example, it is possible to perform signal processing, or the like to make the near clear and the far blurry. Meanwhile, the functions of the 3D processor may be merged into the formatter 360 or within the image processing unit 320.

Meanwhile, an audio processing unit 370 in the controller 170 may perform audio processing of a demultiplexed audio signal. To this end, the audio processing unit may include various decoders.

The audio processing unit 370 may check attribute information on an audio signal. Here, the attribute information may include a volume level and an audio channel (e.g., mono, 2 channels, 4 channels, and 5.1 channels), sound quality of the audio signal (e.g., the number of bits (16 bit, 24 bit)) and audio type (e.g., voice, music).

The audio processing unit 370 may process the entire audio signal based on the attribute information on the audio signal. For example, the audio processing unit 370 may process a base, a treble, a volume control, and the like with respect to an entire input audio signal.

The audio processing unit 370 may separate the entire audio signal for each channel based on the attribute information on the audio signal. For example, when the entire audio signal is two-channel signal, that is, a stereo signal, the audio processing unit 370 may separate the entire audio signal into a left channel and a right channel. For example, when the entire audio signal is a 4-channel signal, the audio processing unit 370 may separate the entire audio signal into front left and right channels and rear left and right channels, respectively.

Meanwhile, in the audio processing unit 370, a component for processing the entire audio signal and a component for processing a channel signal separated from the entire audio signal may be separated and included from each other, and may be located in the same or similar region or in a region separated from each other according to embodiments.

The data processing unit in the controller 170 may perform data processing of the demultiplexed data signal. For example, when the demultiplexed data signal is an encoded data signal, it may be decoded. The encoded data signal may be electronic program guide information including broadcasting information such as a start time and an end time of a broadcast program aired on each channel.

Meanwhile, the block diagram of the controller 170 shown in FIG. 3 is just a block diagram for an embodiment of the present disclosure, and each component of the block diagram may be integrated, added, or omitted according to the specifications of the actually implemented controller 170.

In particular, the frame rate converter 350 and the formatter 360 are not provided in the controller 170, but may be separately provided respectively or may be provided separately as a single module.

Figure 4A:
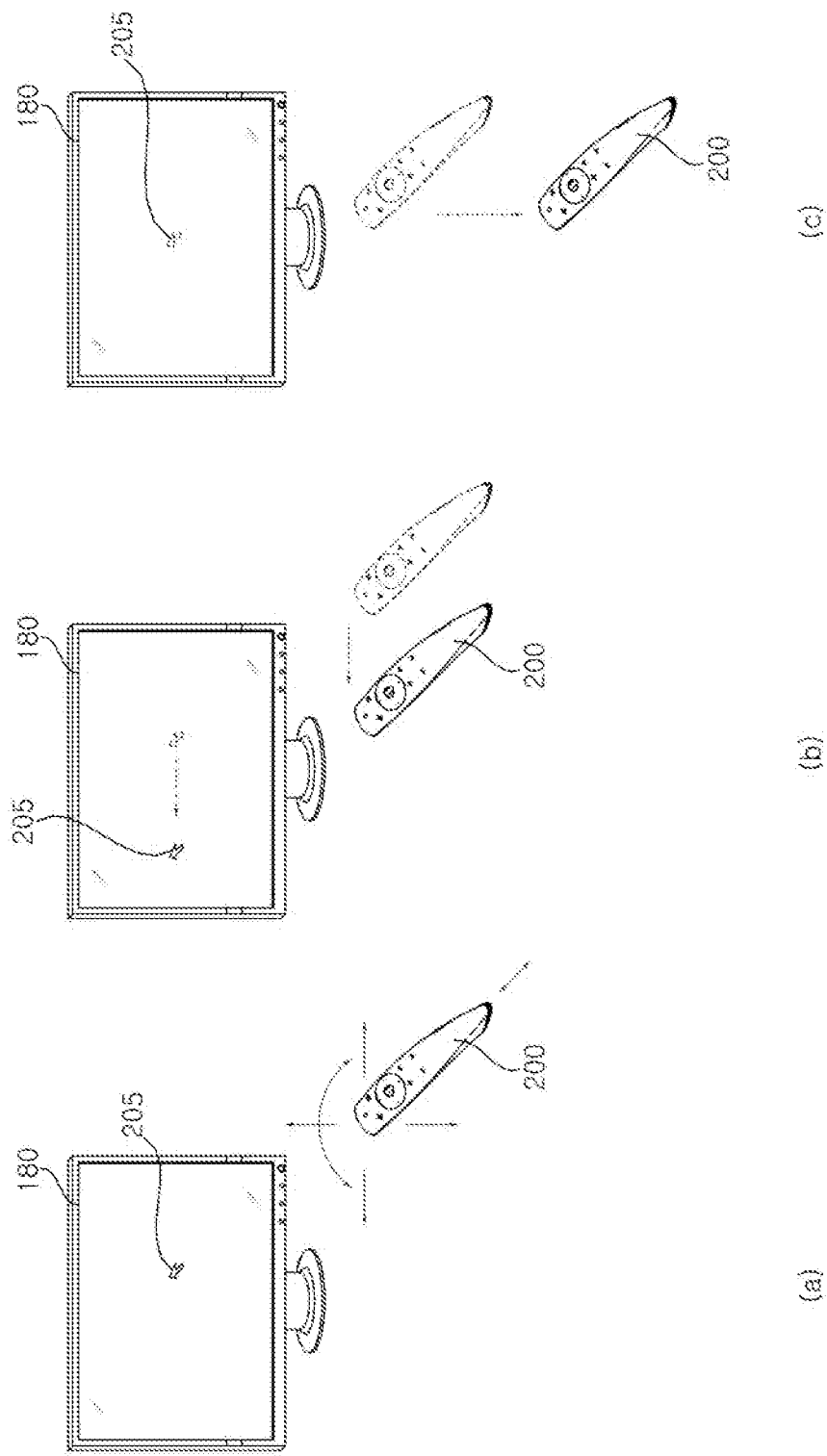
FIG. 4A is a diagram illustrating a control method of the remote control device of FIGS. 1A and 1*i*.
Figure 4B:
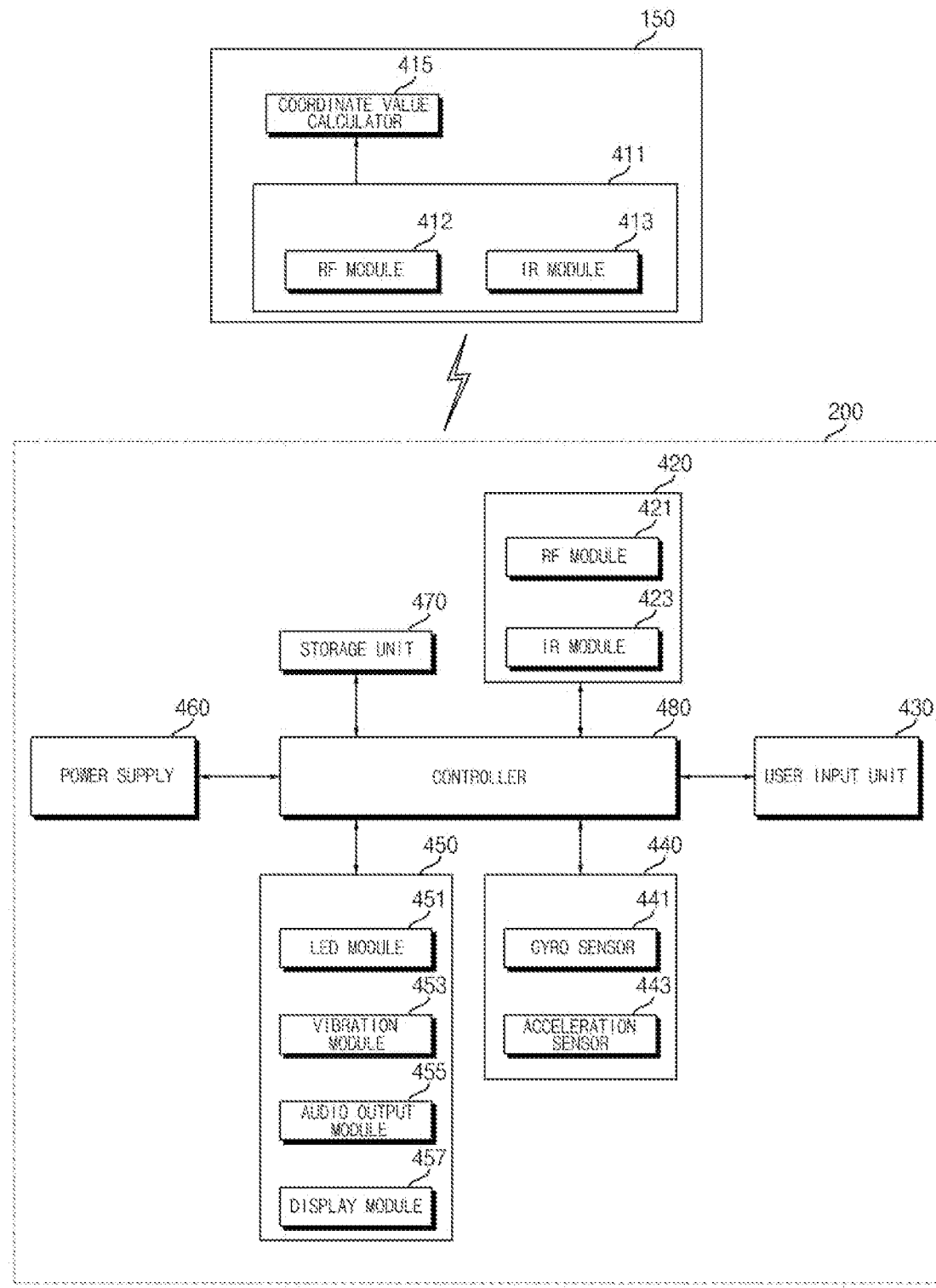
FIG. 4B is an internal block diagram of the remote control device of FIGS. 1A and 1B.

FIG. 4A is a diagram illustrating a control method of the remote control device of FIGS. 1A and 1i, and FIG. 4B is an internal block diagram of the remote control device of FIGS. 1A and 1B.

As shown in FIG. 4A, a pointer 205 corresponding to the remote control device 200 may be displayed on the display 180.

Referring to (a) of FIG. 4A, the user may move or rotate the remote control device 200 up and down, left and right, and back and forth. The movement of the pointer 205 displayed on the display 180 of the image display apparatus may correspond to the movement of the remote control device 200. As shown in the drawing, the remote control device 200 may allow a corresponding pointer 205 to move and be displayed according to movement in a 3D space, and thus may be referred to as a space remote controller or a 3D pointing device.

Referring to (b) of FIG. 4A, when a user moves the remote control device 200 to the left, the pointer 205 displayed on the display 180 of the image display apparatus 100 also moves to the left in response thereto.

Information on the movement of the remote control device 200 detected through a sensor of the remote control device 200 may be transmitted to the image display apparatus 100. The image display apparatus 100 may calculate the coordinate of the pointer 205 from information related to the movement of the remote control device 200. The image display apparatus 100 may display a pointer 205 to correspond to the calculated coordinates.

Referring to (c) of FIG. 4A, a user moves the remote control device 200 away from the display 180 while pressing a specific button in the remote control device 200. Accordingly, the selection area in the display 180 corresponding to the pointer 205 may be zoomed-in to be displayed in an enlarged manner. On the other hand, when the user moves the remote control device 200 closer to the display 180, the selection area in the display 180 corresponding to the pointer 205 may be zoomed-out to be displayed in a reduced size.

Meanwhile, when the remote control device 200 moves away from the display 180, the selection area may be zoomed-out, and when the remote control device 200 approaches the display 180, the selection area may be zoomed-in.

Meanwhile, when a specific button in the remote control device 200 is pressed, the image display apparatus 100 may exclude the determination of the up, down, left and right movements of the remote control device 200. That is, when the remote control device 200 moves away from or approaches the display 180, the up, down, left, and right movements are not determined, but only forward and backward movements may be determined. When a specific button in the remote control device 200 is not pressed, only the pointer 205 may be moved and displayed according to the up, down, left, and right movements of the remote control device 200.

Meanwhile, the moving speed or moving direction of the pointer 205 may correspond to the moving speed or moving direction of the remote control device 200.

Referring to FIG. 4B, the remote control device 200 may include a wireless communication unit 420, a user input unit 430, a sensor unit 440, an output unit 450, a power supply 460, a storage unit 470, and/or a controller 480.

The wireless communication unit 420 may transmit/receive a signal to/from any one of the image display apparatuses according to the embodiments of the present disclosure described above.

In the present embodiment, the remote control device 200 may include an RF module 421 for transmitting and receiving signals to and from the image display apparatus 100 according to a RF communication standard. In addition, the remote control device 200 may include an IR module 423 for transmitting and receiving signals to and from the image display apparatus 100 according to an IR communication standard.

Meanwhile, the remote control device 200 may include at least one communication module for short-range wireless communication. For example, the remote control device 200 may include a communication module for NFC (Near Field Communication).

The remote control device 200 may transmit a signal containing information on the motion of the remote control device 200 to the image display apparatus 100 through the RF module 421. The remote control device 200 may receive the signal transmitted by the image display apparatus 100 through the RF module 421.

The remote control device 200 may transmit a command related to power on/off, channel change, volume change, and the like to the image display apparatus 100 through the IR module 423.

The user input unit 430 may be implemented by a keypad, a button, a touch pad, a touch screen, or the like. The user may operate the user input unit 430 to input a command related to the image display apparatus 100 to the remote controller 200.

When the user input unit 430 includes a hard key button, the user can input a command related to the image display apparatus 100 to the remote control device 200 through a push operation of the hard key button.

When the user input unit 430 includes a touch screen, the user may touch a soft key of the touch screen to input the command related to the image display apparatus 100 to the remote controller 200.

In addition, the user input unit 430 may include various types of input means such as a scroll key, a jog key, etc., which can be operated by the user, and the present disclosure does not limit the scope of the present disclosure.

The user input unit 430 may include at least one microphone and may receive a command corresponding to a user's voice or the like.

The sensor unit 440 may include a gyro sensor 441 or an acceleration sensor 443. The gyro sensor 441 may sense information on the motion of the remote controller 200.

The gyro sensor 441 may sense information on the operation of the remote control device 200 based on the x, y, and z axes. The acceleration sensor 443 may sense information on the moving speed of the remote controller 200. Meanwhile, a distance measuring sensor may be further provided, and thus, the distance to the display 180 may be sensed.

The output unit 450 may output an image or an audio signal corresponding to the operation of the user input unit 430 or a signal transmitted from the image display apparatus 100. Through the output unit 450, the user may recognize whether the user input unit 430 is operated or whether the image display apparatus 100 is controlled.

The output unit 450 may include an LED module 451 that is turned on when the user input unit 430 is operated or a signal is transmitted/received to/from the image display apparatus 100 through the wireless communication unit 420, a vibration module 453 for generating a vibration, an audio output module 455 for outputting an audio, or a display module 457 for outputting an image.

The power supply 460 may supply power to the remote controller 200. When the remote control device 200 is not moved for a certain time, the power supply 460 may stop the supply of power to reduce a power waste. The power supply 460 may resume power supply when a certain key provided in the remote control device 200 is operated.

The storage unit 470 may store various types of programs, application data, and the like necessary for the control or operation of the remote controller 200.

If the remote control device 200 wirelessly transmits and receives a signal to/from the image display apparatus 100 through the RF module 421, the remote control device 200 and the image display apparatus 100 transmit and receive a signal through a certain frequency band. The controller 480 of the remote control device 200 may store information on a frequency band or the like for wirelessly transmitting and receiving a signal to/from the image display apparatus 100 paired with the remote control device 200 in the storage unit 470 and may refer to the stored information.

The controller 480 may include at least one processor, and may control the overall operation of the remote control device 200 by using the processor included therein.

The controller 480 may transmit a signal corresponding to a certain key operation of the user input unit 430 or a signal corresponding to the motion of the remote control device 200 sensed by the sensor unit 440 to the image display apparatus 100 through the wireless communication unit 420.

The user input interface 150 of the image display apparatus 100 may include a wireless communication unit 411 that can wirelessly transmit and receive a signal to and from the remote control device 200 and a coordinate value calculator 415 that can calculate the coordinate value of a pointer corresponding to the operation of the remote controller 200.

The user input interface 150 may wirelessly transmit and receive a signal to and from the remote control device 200 through the RF module 412. In addition, the user input interface 150 may receive a signal transmitted by the remote control device 200 through the IR module 413 according to an IR communication standard.

The coordinate value calculator 415 may correct a hand shake or an error from a signal corresponding to the operation of the remote control device 200 received through the wireless communication unit 151 and calculate the coordinate value (x, y) of the pointer 205 to be displayed on the display 180.

The transmission signal of the remote control device 200 inputted to the image display apparatus 100 through the user input interface 150 may be transmitted to the signal processing unit 170 of the image display apparatus 100. The signal processing unit 170 may determine the information on the operation of the remote control device 200 and the key operation from the signal transmitted from the remote controller 200, and, correspondingly, control the image display apparatus 100.

For another example, the remote control device 200 may calculate the pointer coordinate value corresponding to the operation and output it to the user input interface 150 of the image display apparatus 100. In this situation, the user input interface 150 of the image display apparatus 100 may transmit information on the received pointer coordinate value to the signal processing unit 170 without a separate correction process of hand shake or error.

For another example, unlike the drawing, the coordinate value calculator 415 may be provided in the signal processing unit 170, not in the user input interface 150.

Figure 5:
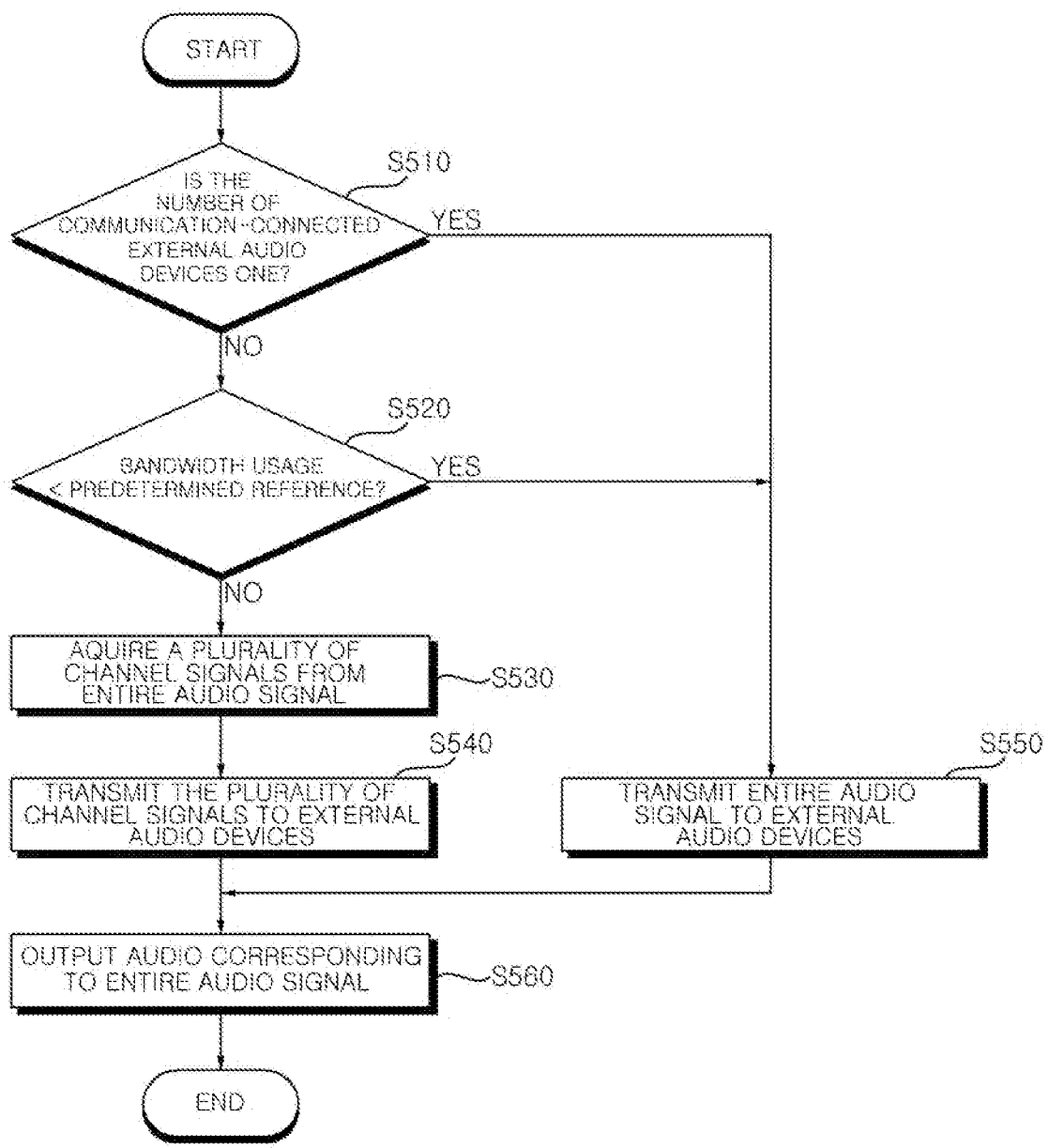
FIG. 5 is a flowchart illustrating a method of operating the image display apparatus according to an embodiment of the present disclosure.

FIG. 5 is a flowchart illustrating a method of operating the image display apparatus according to an embodiment of the present disclosure, and FIGS. 6A to 7C are diagrams referenced for explaining a method of operating the image display apparatus.

Referring to FIG. 5, in operation S510, the image display apparatus 100 may check the number of external audio devices 500 connected through short-range communication. For example, the image display apparatus 100 may check the number of external audio devices 500 connected to communication through Bluetooth pairing.

In operation S520, when the number of communication-connected external audio devices 500 is two or more, the image display apparatus 100 may check whether the bandwidth usage for the short-range communication is less than a predetermined reference. For example, the image display apparatus 100 may calculate the bandwidth usage for the short-range communication based on the operation state of the external device interface 130, the type and number of external devices connected to short-range communication, a communication state, and attribute information of an audio signal, and the like.

Meanwhile, the predetermined reference may be determined according to a maximum allowable value of bandwidth usage for the short-range communication, and as the maximum allowable value of bandwidth usage increases, a bandwidth usage corresponding to the reference may also increase. For example, the predetermined reference may be set to 80% of the maximum allowable value of bandwidth usage.

Figure 6A:
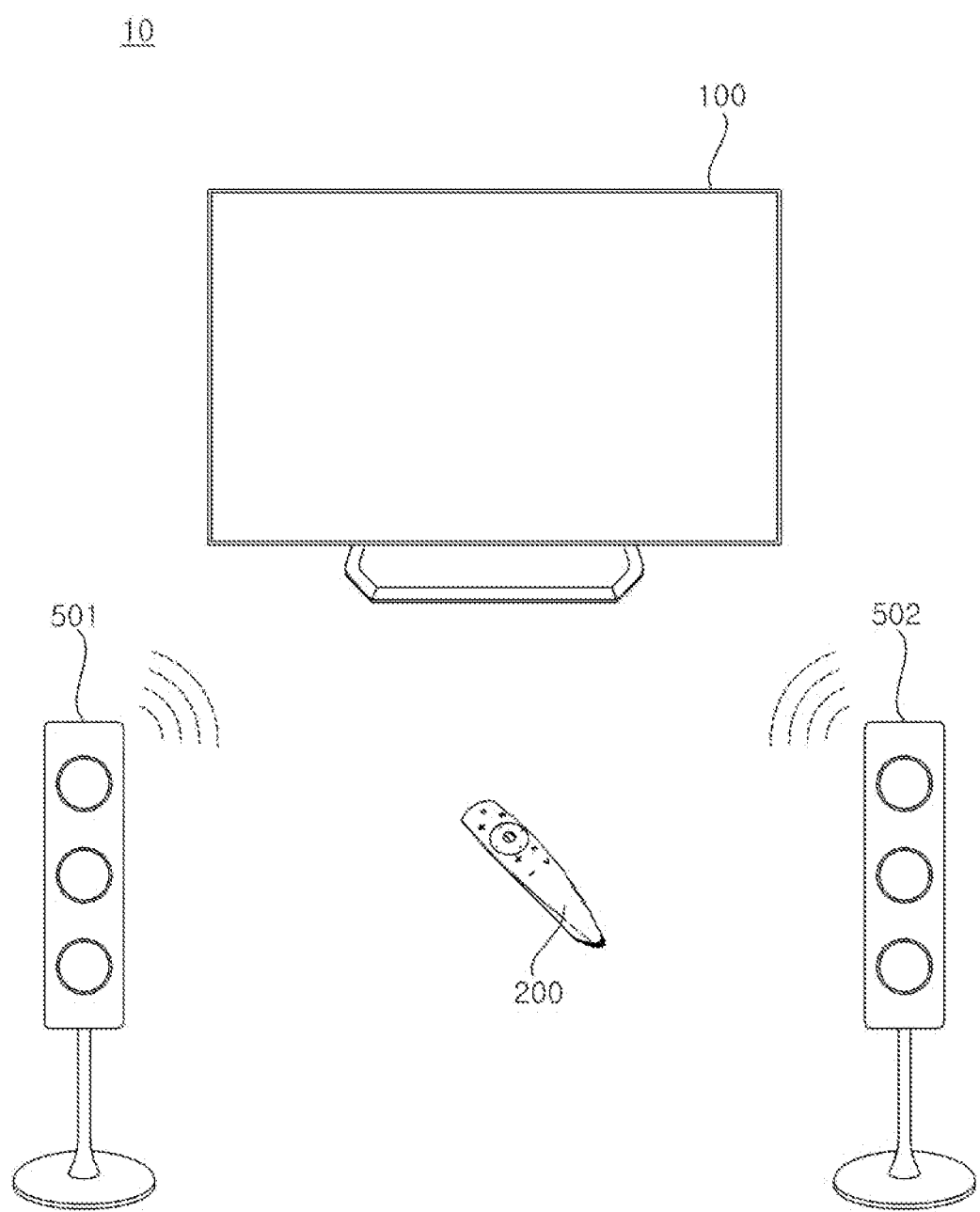
FIGS. 6A to 7C are diagrams referenced for explaining a method of operating the image display apparatus.
Figure 6B:
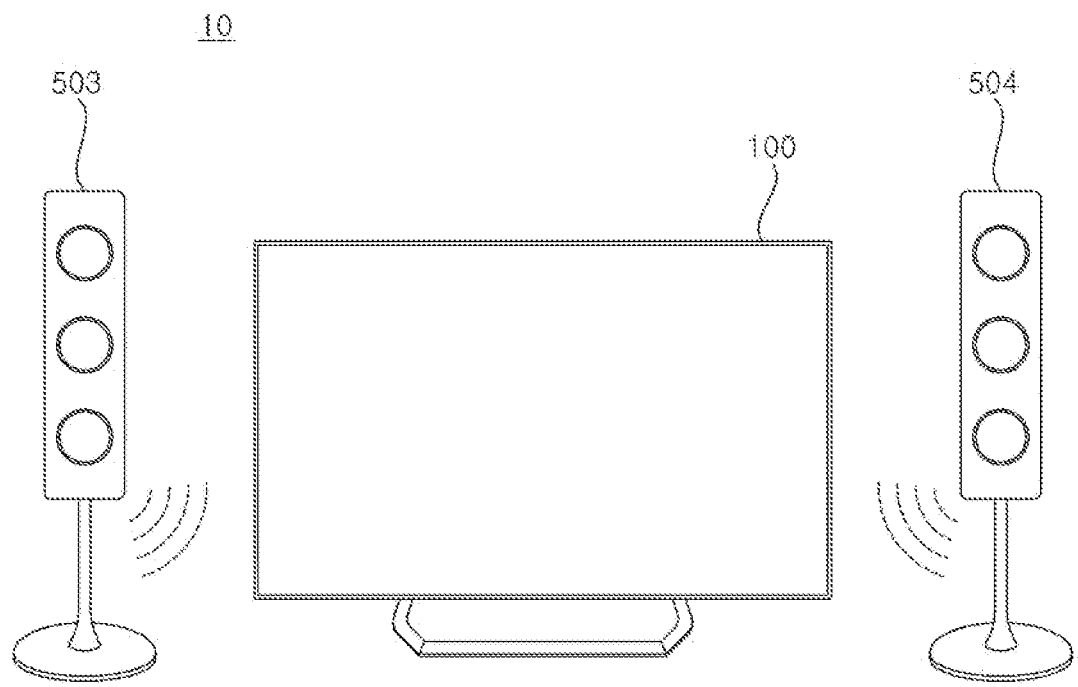
Figure 6B:
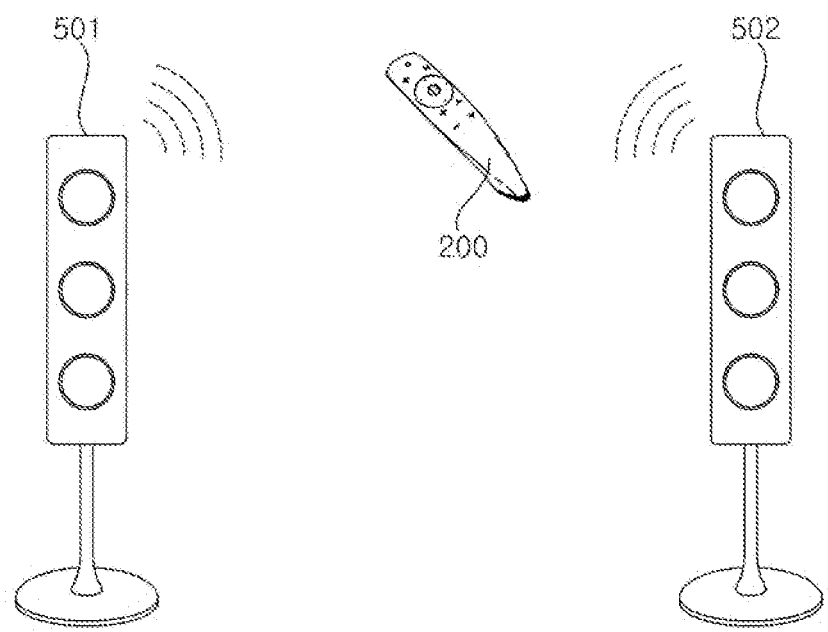

Referring to FIGS. 6A and 6B, the image display apparatus 100 may be connected to two external audio devices 501 and 502 or four external audio devices 501 to 504 through short-range communication. In this case, the image display apparatus 100 may calculate the bandwidth usage for the short-range communication with reference to Table 1 below.

TABLE 1

| Audio channel | Sound quality | Bandwidth usage (%) |
|---|---|---|
| Mono | Low-quality (16bit) | 16 |
| | High-quality (24bit) | 20 |
| Stereo | Low-quality (16bit) | 24 |
| | High-quality (24bit) | 35 |

Table 1 above is an example of a bandwidth usage according to attribute information of an audio signal when the audio signal is transmitted to one external audio device 500.

Meanwhile, when short-range communication of the image display apparatus 100, for example, Bluetooth is activated, operations generally performed in connection with short-range communication, such as an inquiry scan and a page scan, are performed by default. Accordingly, 10% of the maximum allowable value of bandwidth usage may be basically used when the short-range communication is activated.

In this case, when the image display apparatus 100 transmits a high-quality stereo signal to the two external audio devices 501 and 502 at the same time, the bandwidth usage is at least 80%. Accordingly, the bandwidth usage for the short-range communication may be calculated more than the predetermined reference (e.g., 80%).

In addition, when the image display apparatus 100 transmits low-quality stereo signals to four external audio devices 501 to 504 at the same time, the bandwidth usage is at least 106%. Even in this case, the bandwidth usage for the short-range communication may be calculated more than the predetermined reference (e.g., 80%).

Meanwhile, when the image display apparatus 100 is connected to another external device through short-range communication or performs an additional operation related to short-range communication (e.g., BLE signal transmission), the bandwidth usage for the short-range communication may increase further Referring to FIG. 5, in operation S530, when the number of communication-connected external audio devices 500 is two or more, and the bandwidth usage is greater than or equal to the predetermined reference, the image display apparatus 100 may acquire a plurality of channel signals from an entire audio signal. For example, when the entire audio signal is a stereo signal, the image display apparatus 100 may obtain a left channel signal and a right channel signal from the entire audio signal. For example, when the entire audio signal is a 4-channel signal, the image display apparatus 100 may obtain front left and right channel signals and rear left and right channel signals from the entire audio signal, respectively.

In operation S540, the image display apparatus 100 may transmit a plurality of channel signals obtained from the entire audio signal to two or more external audio devices 500, respectively. For example, when the image display apparatus 100 is connected to communication with two external audio devices 501 and 502, and the bandwidth usage for the short-range communication is more than the predetermined reference (e.g., 80%), the image display apparatus 100 may transmit the left channel signal and the right channel signal obtained from the entire audio signal to the two external audio devices 501 and 502, respectively.

Meanwhile, when the left channel signal and the right channel signal obtained from the entire audio signal are a high-quality mono signal, and the two signals are transmitted to the two external audio devices 501 and 502, respectively, the bandwidth usage (e.g., 50%) may satisfy the predetermined reference (e.g., 80%).

In this case, the image display apparatus 100 may process a plurality of channel signals obtained from the entire audio signal based on a predetermined audio parameter in relation to the audio output of the external audio device 500, and may transmit the plurality of channel signals for which signal processing is completed to two or more external audio apparatuses 500, respectively. For example, when a user sets a bass enhancement mode for audio output through the external audio device 500, the image display apparatus 100 may process the left channel signal and the right channel signal according to a bass enhancer parameter stored in the storage unit 140, respectively, and may transmit the left channel signal and the right channel signal to two or more external audio apparatuses 500, respectively.

Meanwhile, in operation S550, the image display apparatus 100 may transmit the entire audio signal to the external audio device 500, when the number of external audio devices 500 connected to communication is one, or when the number of external audio devices 500 is two or more and the bandwidth usage is less than the predetermined reference. In this case, the image display apparatus 100 may transmit the entire audio signal to the external audio device 500 without signal processing for the entire audio signal according to the predetermined audio parameter, and the external audio device 500 may output audio by processing the entire audio signal received from the image display apparatus 100.

In operation S560, the image display apparatus 100 may output audio corresponding to the entire audio signal through at least one speaker included in the audio output unit 185. In this case, the image display apparatus 100 may process the entire audio signal based on a predetermined audio parameter in relation to the audio output of the image display apparatus 100, and may output audio corresponding to the processed entire signal through the at least one speaker included in the audio output unit 185.

Meanwhile, the predetermined audio parameter in relation to the audio output of the image display apparatus 100 may be different from the predetermined audio parameter in relation to audio output of the external audio device 500. In this case, the image display apparatus 100 may process the entire audio signal and the plurality of channel signals, respectively, based on audio parameters predetermined for each of the image display apparatus 100 and the external audio device 500.

Meanwhile, referring to FIGS. 6A and 6B, the image display apparatus 100 may determine positions of two or more external audio devices 500 and transmit a plurality of channel signals according to the positions of the external audio devices 500.

The image display apparatus 100 may determine the positions of the external audio devices 500 based on an order in which two or more external audio devices 500 are connected to the image display apparatus 100 in communication. For example, among the two external audio devices 501 and 502, the position of the first external audio device 501 connected to communication first may be determined to the left, and the position of the second external audio device 502 connected to communication afterwards may be determined to the right. In addition, the left channel signal may be transmitted to the first external audio device 501 and the right channel signal may be transmitted to the second external audio device 502, respectively.

The image display apparatus 100 may sequentially transmit sample audio signals to two or more external audio devices 500, and may determine the location of the external audio device 500 based on audio corresponding to the sample audio signal output from the external audio device 500. For example, the image display apparatus 100 may include a plurality of microphones disposed at a predetermined distance apart from the housing of the image display device 100, and may receive audio corresponding to the sample audio signals sequentially output from four external audio devices 501 to 504 through the plurality of microphones. In this case, the image display apparatus 100 may determine the locations of the external audio devices 501 to 504, respectively, based on a difference between loudness of the audio received by the plurality of microphones.

Meanwhile, the plurality of microphones may be provided in the remote control device 200, and the image display apparatus 100 may determine the location of the external audio device 500 based on a difference between loudness of the audio corresponding to the sample audio signal received by the remote control device 200.

Figure 7A:
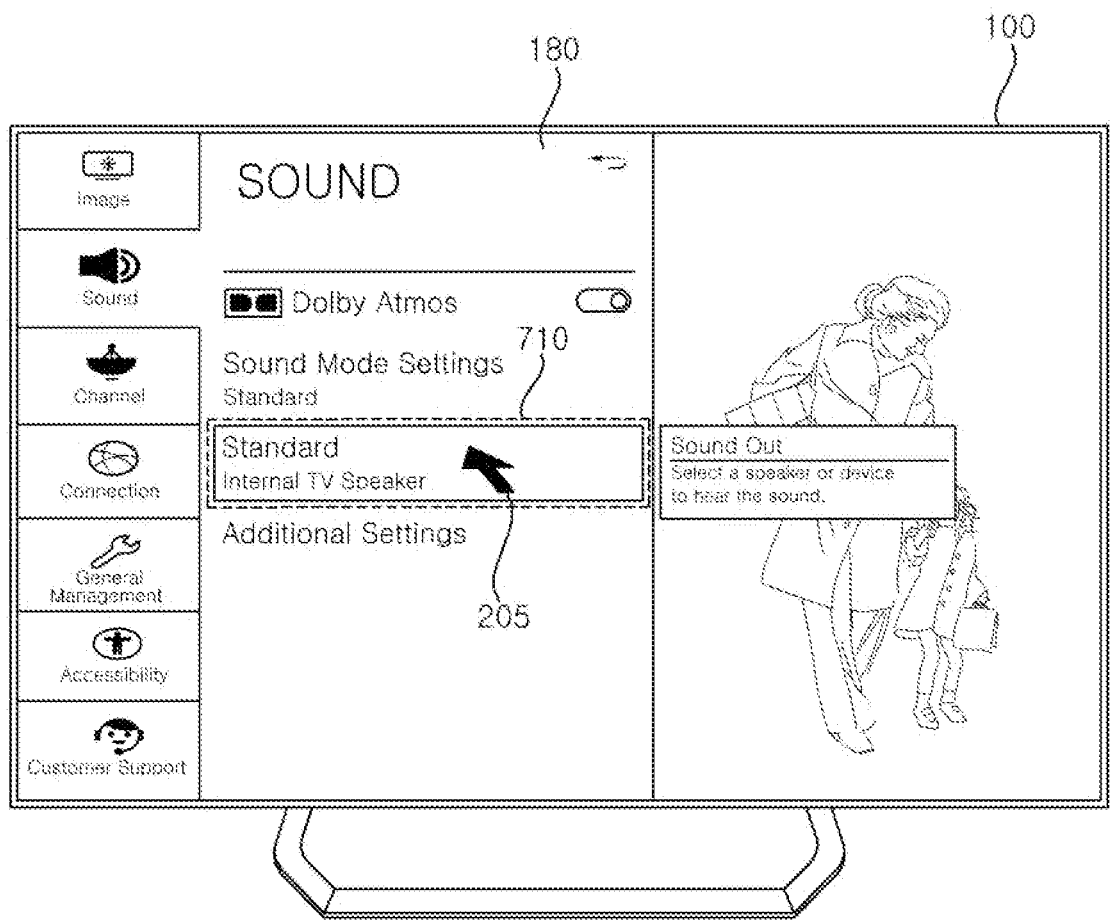
Figure 7B:
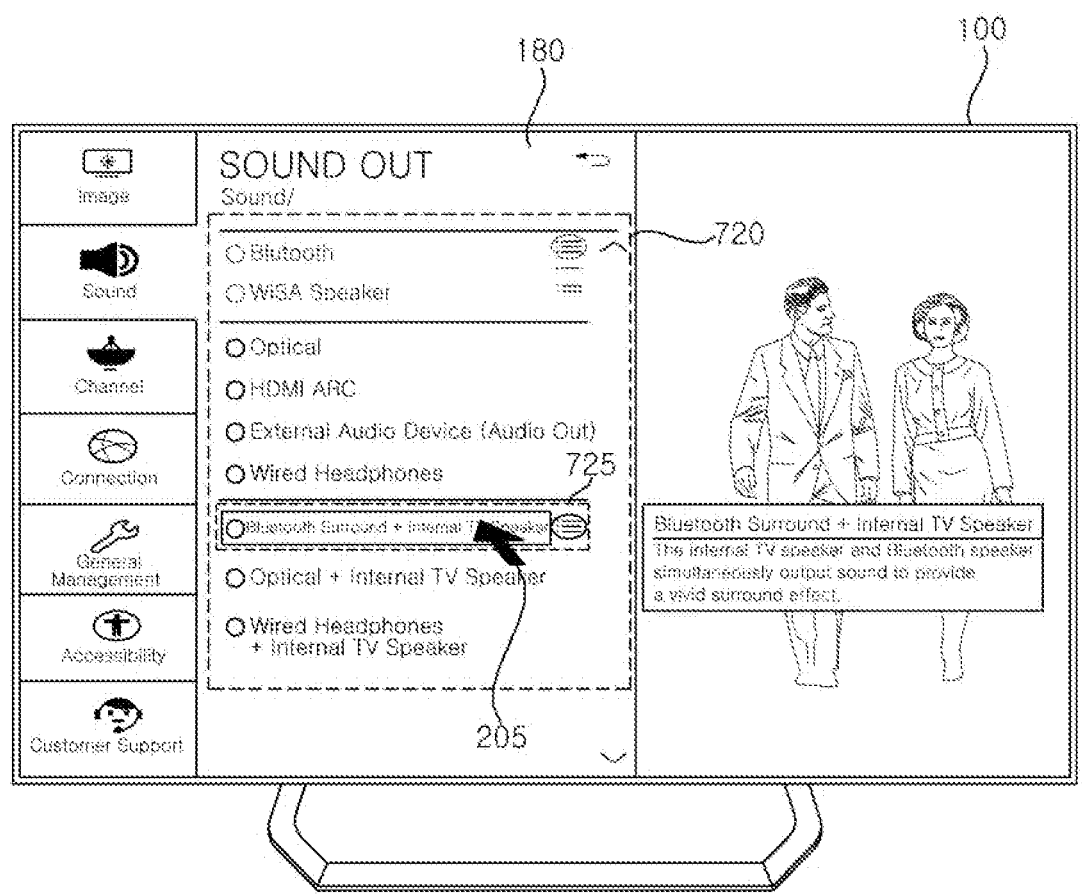
Figure 7C:
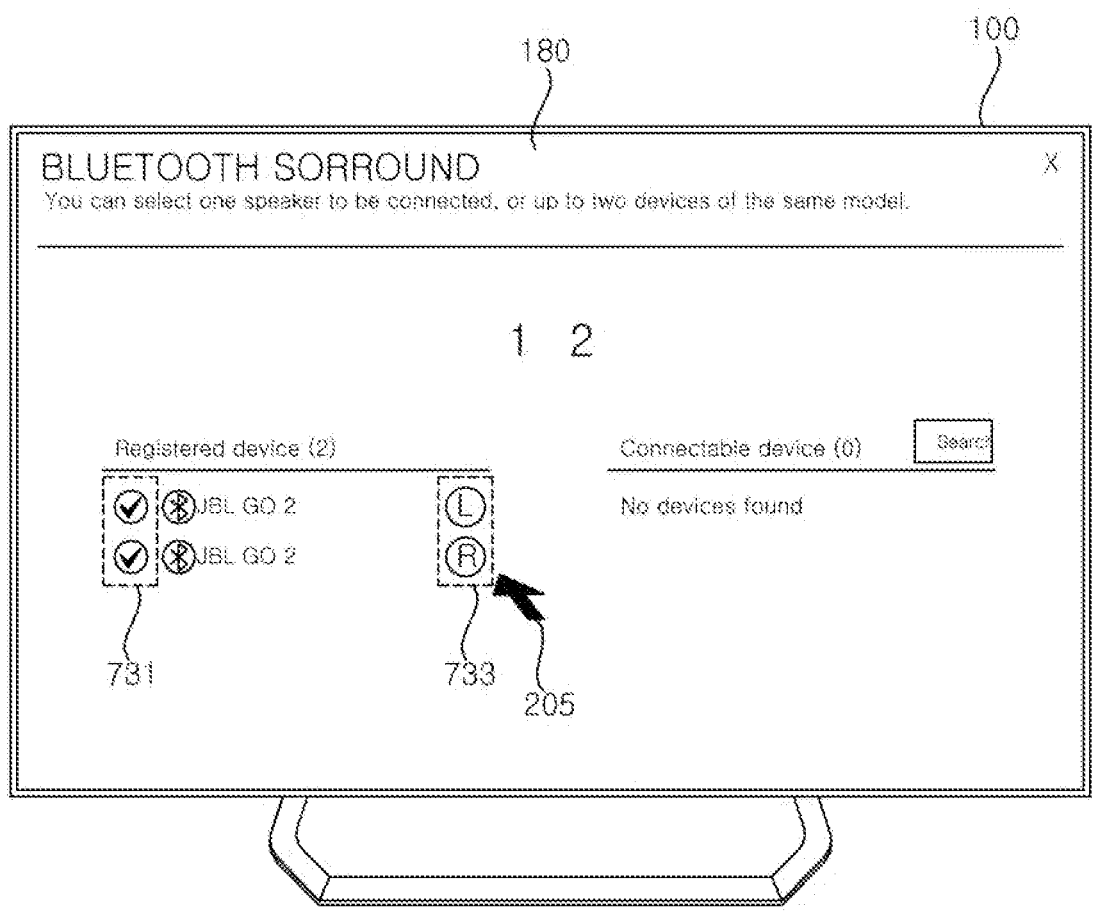

Referring to FIGS. 7A to 7C, the image display apparatus 100 may determine the external audio device 500 to be connected to communication based on a user input received from the remote control device 200, and may determine the positions of two or more external audio devices 500.

Referring to FIG. 7A, a user may cause the image display device 100 to execute a setting function 710 for determining a device to output audio by using a pointer 205 corresponding to the remote control device 200 displayed on the display 180 of the image display device 100.

Referring to FIG. 7B, in order to listen to the surround sound through the plurality of external audio devices 500, the user may select an item 725 corresponding to the external audio device 500 and a speaker of the image display apparatus 100 from among the items in a list 720 for devices that output audio, using the pointer 205 corresponding to the remote control device 200.

Referring to 731 of FIG. 7C, the user may select a device to be used for outputting audio from among the plurality of external audio devices 500 by using the pointer 205 corresponding to the remote control device 200. Meanwhile, Referring to 733 of FIG. 7C, the user may arbitrarily determine the positions of the plurality of external audio devices 500 by using the pointer 205 corresponding to the remote control device 200.

According to the embodiments of the present disclosure, the image display apparatus 100 may separate the entire audio signal into a plurality of channel signals, process the plurality of channel signals, and transmit the processed channel signals to two or more external audio devices 500, respectively, when two or more external audio devices 500 are connected to the image display apparatus 100 and the bandwidth usage exceeds the allowable value. Through this, it is possible to stably transmit audio signals to both of two or more external audio devices 500 and to provide a high-quality surround sound to a user.

The accompanying drawings are used to assist in easy understanding of various technical features and it should be understood that the embodiments presented herein are not limited by the accompanying drawings. As such, the present disclosure should be construed to extend to any alterations, equivalents and substitutes falling within the spirit and scope of the present disclosure.

Meanwhile, an operating method of the server and the system including the same according to the present disclosure can be realized as a processor-readable code written on a recording medium readable by a processor included in the server and the system including the same. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An image display apparatus comprising:
a display;
an external device interface including at least one communication module configured to perform short-range communication; and
a controller configured to:
determine a number of external audio devices communicatively connected with the image display apparatus, and compare a bandwidth usage for the short-range communication to a predetermined reference,
wherein the predetermined reference is determined according to a maximum allowable value of the bandwidth usage used for the short-range communication, and
based on the number of the external audio devices being two or more, and the bandwidth usage being greater than or equal to the predetermined reference:
acquire a plurality of channel signals from the entire audio signal;
transmit a first channel signal from among the plurality of channel signals to a first external audio device among the external audio devices; and
transmit a second channel signal from among the plurality of channel signals to a second external audio device among the external audio devices.

2. The image display apparatus according to claim 1, wherein, based on the number of the external audio devices being two or more and the bandwidth usage being greater than or equal to the predetermined reference, the controller is configured to determine the first external audio device and the second external audio device based on an order in which the two or more external audio devices are connected to the image display apparatus.

3. The image display apparatus according to claim 1, further comprising a plurality of microphones,
wherein, based on the number of the external audio devices being two or more and the bandwidth usage being greater than or equal to the predetermined reference, the controller is configured to:
sequentially transmit sample audio signals to the two or more external audio devices;

control the plurality of microphones to receive audio output from the external audio devices;
determine positions of the external audio devices based on signals received from the plurality of microphones; and
determine the first external audio device and the second external audio device based on the positions of the external audio devices.

4. The image display apparatus according to claim 1, wherein, based on the number of the external audio devices being two or more and the bandwidth usage being greater than or equal to the predetermined reference, the controller is configured to:
sequentially transmit sample audio signals to the two or more external audio devices;
receive, through the external device interface unit, data on loudness of audio received by each of a plurality of microphones provided in a remote control device from the remote control device;
determine positions of the external audio devices based on based on the received data on the loudness of audio; and
determine the first external audio device and the second external audio device based on the positions of the external audio devices.

5. The image display apparatus according to claim 3, wherein the controller is configured to determine the positions of the external audio devices based on a difference between loudness of audio received by each of the plurality of microphones.

6. The image display apparatus according to claim 1, further comprising at least one speaker,
wherein the controller is configured to:
process the entire audio signal and the plurality of channel signals based on a predetermined audio parameter in relation to audio output;
output audio corresponding to the processed entire audio signal through the at least one speaker; and
transmit the processed plurality of channel signals to the external audio devices, respectively.

7. A method of an image display apparatus including, the method comprising:
determining a number of external audio devices communicatively connected with the image display apparatus, and comparing a bandwidth usage for the short-range communication to a predetermined reference,
wherein the predetermined reference is determined according to a maximum allowable value of the bandwidth usage used for the short-range communication; and
based on the number of the external audio devices being two or more, and the bandwidth usage being greater than or equal to the predetermined reference:
acquiring a plurality of channel signals from the entire audio signal;
transmitting, through the external device interface, a first channel signal from among the plurality of channel signals to a first external audio device among the external audio devices; and
transmitting, through the external device interface, a second channel signal from among the plurality of channel signals to a second external audio device among the external audio devices.

8. The method according to claim 7, further comprising:
based on the number of the external audio devices being two or more and the bandwidth usage being greater than or equal to the predetermined reference, determining positions of the external audio devices, and determining the first external audio device and the second external audio device.

9. The method according to claim 8, wherein the determining of the first external audio device and the second external audio device comprises:
determine an order in which the two or more external audio devices are connected to the image display apparatus; and
determining the first external audio device and the second external audio device according to the determine order.

10. The method according to claim 8, wherein the determining of the first external audio device and the second external audio device comprises:
sequentially transmitting sample audio signals to the two or more external audio devices;
receiving, through a plurality of microphones of the image display apparatus, audio output from the external audio devices;
determining positions of the external audio devices based on signals received from the plurality of microphones; and
determining the first external audio device and the second external audio device based on the positions of the external audio devices.

11. The method according to claim 8, wherein the determining of the first external audio device and the second external audio device comprises:
sequentially transmitting sample audio signals to the two or more external audio devices;
receiving, through the external device interface unit, data on loudness of audio received by each of a plurality of microphones provided in a remote control device from the remote control device;
determining positions of the external audio devices based on based on the received data on the loudness of audio; and
determining the first external audio device and the second external audio device based on the positions of the external audio devices.

12. The method according to claim 10, wherein the determining of the positions of the external audio devices comprises:
determining the positions of the external audio devices based on a difference between loudness of audio received by each of the plurality of microphones.

13. The method according to claim 7, further comprising:
processing the entire audio signal and the plurality of channel signals based on a predetermined audio parameter in relation to audio output;
outputting audio corresponding to the processed entire audio signal through at least one speaker of the image display apparatus; and
transmitting the processed plurality of channel signals to the external audio devices, respectively.

14. The image display apparatus according to claim 1, wherein, based on the number of external audio devices communicatively connected with the image display apparatus being one, or based on the bandwidth usage for the short-range communication being less than the predetermined reference, the controller is configured to transmit an entire audio signal to the one external audio device.

15. The method according to claim 7, further comprising:
based on the number of external audio devices communicatively connected with the image display apparatus being one, or based on the bandwidth usage for short-range communication being less than the predetermined reference, transmitting an entire audio signal to the one external audio device through an external device interface that includes at least one communication module configured to perform the short-range communication.

\* \* \* \* \*